Jan. 22, 1957  H. C. FISCHER ET AL  2,778,202
DISPENSER FOR SEMIFROZEN BEVERAGES AND AGITATOR MEANS THEREFOR
Filed Feb. 14, 1955
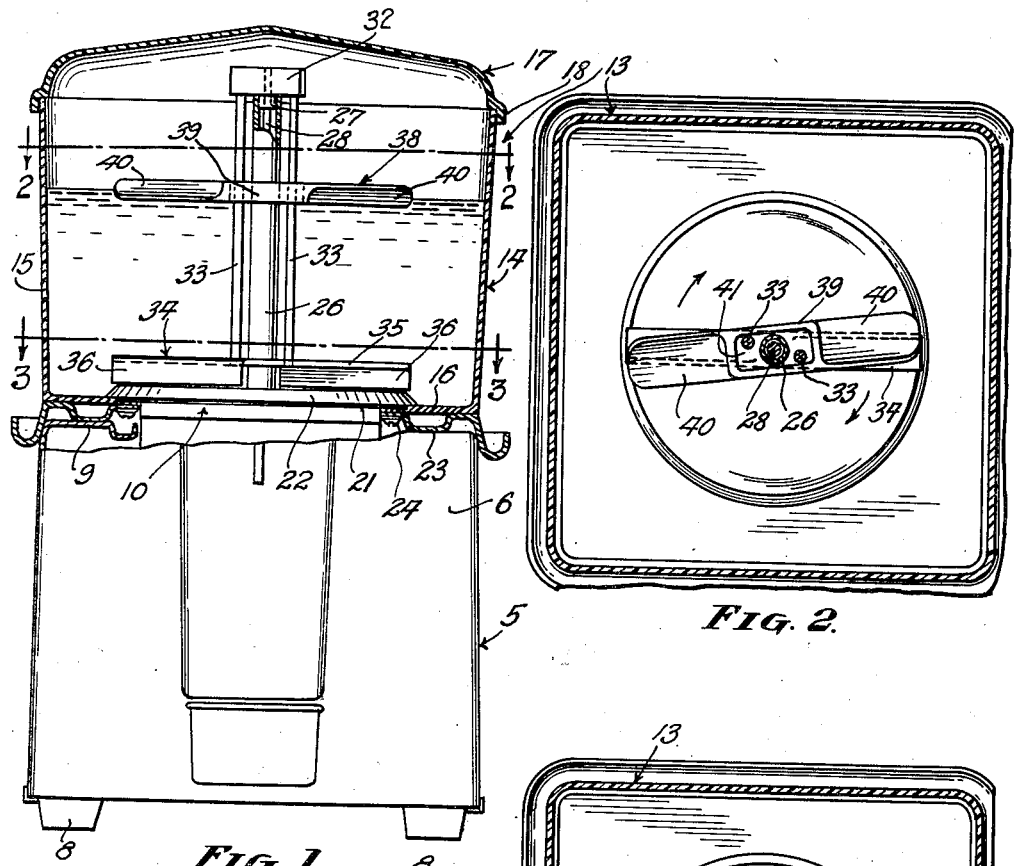
FIG. 1.
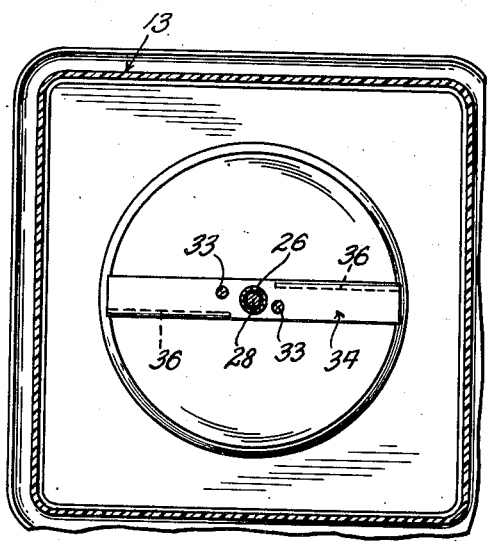
FIG. 2.
FIG. 3.
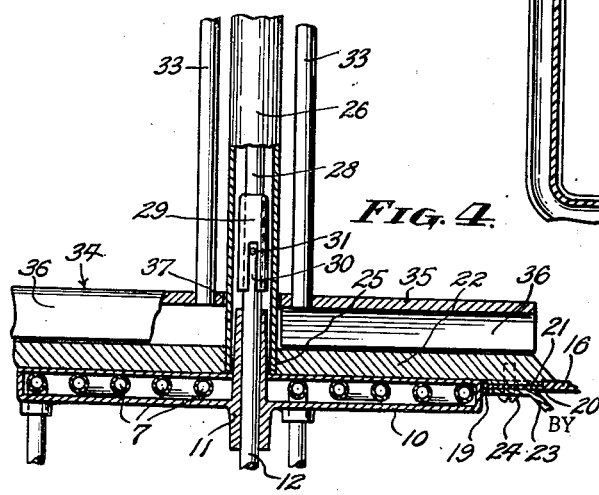
FIG. 4.
INVENTORS
Harry C. Fischer &
Louis P. Benua
BY W. S. Rambo
ATTORNEY

United States Patent Office 2,778,202
Patented Jan. 22, 1957

2,778,202

DISPENSER FOR SEMIFROZEN BEVERAGES AND AGITATOR MEANS THEREFOR

Harry C. Fischer, Canal Winchester, and Louis P. Benua, Gahanna, Ohio, assignors to The Ebco Manufacturing Company, Columbus, Ohio, a corporation of Ohio Application February 14, 1955, Serial No. 488,049

2 Claims. (Cl. 62—114)

This invention relates generally to apparatus for producing and dispensing semifrozen beverages, such as milk shakes, ices, partially frozen custards, and the like, wherein the beverage is comprised of both liquid and frozen parts. More particularly, the present invention is concerned with an improved beverage-agitating and stirring mechanism for semifrozen beverage dispensers which, in operation, serves to impart uniform and constant agitation or stirring to the beverage throughout substantially all parts thereof to insure homogeneity between frozen and unfrozen parts and to prevent undesirable stratification or separation between the frozen and unfrozen parts of the beverage.

It has been proposed in the past to provide so-called "counter-type" dispensers for preparing, maintaining, and dispensing various types and flavors of beverages comprised of both frozen and unfrozen parts, and wherein such dispensers generally comprise a portable, electrically-actuated, refrigeration machine including a receptacle section removably mounted or carried upon a machinery-housing base section, a motor driven agitator for stirring the beverage within the receptacle section, control means for operating the refrigeration system of the machine in a manner to control the proportion of frozen to unfrozen parts within the beverage, and a valve or tap for drawing off desired individual portions or servings of the semifrozen beverage for sale to the consumer. A dispenser of this general type is shown and described in our prior co-pending application Serial No. 315,567, filed October 18, 1952, now Patent No. 2,734,347, granted February 14, 1956, entitled Method and Apparatus for Producing and Dispensing Beverages Having Frozen Particles Therein.

It has been found, however, that previous beverage dispensers of this type failed to provide the desired stirring or agitation necessary to insure uniformity or homogeneity within the semifrozen beverage contained in the dispenser with the result that individual servings of the beverage would vary quite widely in their consistencies, whereby one serving might be completely liquid while the next serving would be almost completely frozen. Moreover, this undesirable lack of uniformity as between individual servings, and the tendency of the beverage toward stratification within the dispenser, apparently increases upon an increase in the desired thickness or viscosity of the beverage produced. For example, when it is desired to produce and dispense relatively thick semifrozen beverages, such as malted milks or milk shakes, dispensers which normally provide only a single relatively slow speed agitator, located in the receptacle section near the bottom thereof, fail to provide sufficient stirring or agitation of the beverage throughout its entirety, and particularly in the upper levels of the beverage, with the result that the lightweight ice crystals or frozen particles of the beverage tend to rise and accumulate in the upper regions of the beverage. Thus, when the outlet valve or tap of the dispenser is opened to discharge an individual serving, usually taken from the lowermost region of the body of the beverage within the dispenser, such serving is undesirably thin and relatively free of frozen particles.

It follows, therefore, that the primary object of the present invention is to improve generally upon the structure and function of the agitator or stirring means for semifrozen beverage dispensers by providing an improved floating-type agitator which, in operation, serves to stir and agitate the semifrozen beverage, particularly in the upper regions thereof, to thereby insure complete mixing of the frozen and unfrozen parts of the beverage within the receptacle section thereof.

It is another object of this invention to provide an agitator for semifrozen beverage dispensers which may be readily and simply disassembled and reassembled for cleaning purposes; which is efficient in operation; and one which may be used in association with existing single agitator-type dispensers without substantial modification thereto.

For a further and more detailed understanding of this invention and additional objects and advantages resulting therefrom, reference is made to the following description and the accompanying drawing, wherein:

Fig. 1 is a side elevational view, partially in vertical section, of a semifrozen beverage dispenser embodying our improved agitator mechanism;

Fig. 2 is a horizontal sectional view taken along the line 2—2 of Fig. 1;

Fig. 3 is a similar view taken along the line 3—3 of Fig. 1; and

Fig. 4 is an enlarged fragmentary vertical sectional view taken through the lower agitator member and the heat exchanger assembly of the dispenser.

Referring now to the drawing, the numeral 5 designates generally the base section of an electrically actuated and mechanically refrigerated, counter-type, semifrozen beverage dispenser. The base section includes an outer, generally rectangular casing 6 which houses the usual components of an electric motor-driven mechanical refrigeration system which, with the exception of the evaporator or cooling coil 7, are not shown. The base section 5 is provided at the bottom corners thereof with depending legs 8 upon which the dispenser is supported on a counter surface or the like. Mounted within, and extending slightly above, the central portion of the top wall 9 of the base section is a circular cold plate or disk-like body 10 which contains, or in which may be formed, the evaporator or cooling coil 7 of the refrigeration system. The cooling coil 7, in the usual manner, provides a continuous passage through which a refrigerant is circulated by the usual compressor of the refrigeration system to chill the cold plate 10.

Carried by and extending axially through the cold plate 10 is a bearing sleeve 11 which rotatably supports a vertically arranged agitator drive shaft 12 which, in turn, is connected at its lower end to be driven in rotation by an electric motor, not shown. The upper end of the drive shaft 12 extends vertically upwardly beyond the upper end of the bearing sleeve 11, as shown in Fig. 4.

The dispenser further includes an upper generally cubical receptacle section, generally indicated by the numeral 13, which, in the operation of the dispenser, is carried upon the base section 5, as shown in Fig. 1, but which is removable from the base section as a unit for disassembly and cleaning purposes. The receptacle section includes an open top receptacle body 14, preferably formed from a molded synthetic resin, either transparent or opaque, and having relatively good thermal insulating properties. The receptacle body is preferably rectangular in cross section and is formed to include upstanding side walls 15 and a horizontally disposed bottom wall 16.

The open upper end of the receptacle body is closed by means of a removable dome-shaped cover or lid member 17 formed with a depending marginal flange 18 adapted to closely telescope the upper rim of the receptacle body.

The bottom wall 16 of the receptacle body is formed with a central circular opening 19 and is rabbeted a distance radially outwardly from such opening, as at 20, to receive the depending circular skirt portion 21 formed integrally with a disk-like heat-exchanger or contact plate 22 preferably formed from a high heat-conductivity metal, such as brass or aluminum, which, advantageously, may be plated on its exterior surfaces with a corrosion-resistant metal, such as chromium. The contact plate 22 thus forms a partial bottom wall for the receptacle body 14 and is arranged to have its flat under surface overlie and directly engage the flat upper surface of the cold plate 10 when the receptacle section 13 is operatively positioned on the base section 5 to provide direct heat-transfer conduction between the cold plate and contact plate, and through the latter, to a beverage introduced within the receptacle body. As shown particularly in Figs. 1 and 4, the receptacle section 13 also includes at its lower portion an annular and generally rectangular frame member 23 which, at its inner side, is connected at spaced intervals directly with the rabbeted shoulder region of the bottom wall 16 of the receptacle body by means of screws 24. The screws 24 extend through openings formed in the bottom wall 16 and into suitably located tapped openings formed in the contact plate 22 to tightly connect the frame member 23, the bottom wall 16, and the plate 22. If desired, a liquid-tight seal between the bottom wall 16 of the receptacle body and the marginal edge portions of the contact plate 22 may be assured by the use of a suitable thermal mastic material between the relatively contacting portions of the plate 22 and the bottom wall 16.

As shown particularly in Fig. 4 of the drawing, the contact plate 22 is formed with a central through opening 25 in which is mounted and securely held, as by means of soldering or brazing, the lower end of an upwardly extending bearing tube 26, the latter terminating at its upper end substantially in the plane of the upper rim of the receptacle body, and well above the normal level of a beverage contained therein. The tube 26 receives in its upper end a suitable annular bearing 27 which is carried by and supports a drive shaft extension 28 coaxially within the tube 26. The extension 28 is provided at its lower end with a diametrically enlarged detachable coupling member 29 formed with a socket to drivingly receive the upper end portion of the drive shaft 12 carried by the base section. Advantageously, a detachable driving connection may be obtained between the shaft extension 28 and the drive shaft 12 by slotting the side wall of the coupling member 29, as at 30, to permit the latter to receive a radially extended pin 31 formed on the outer end of the agitator drive shaft 12.

The upper end of the drive shaft extension 28, above the bearing tube 26, is drivingly connected with a cross arm 32 which carries at the opposite ends thereof a pair of depending, spaced, parallel rods 33. The rods 33 extend downwardly within the receptacle body 14 in radially outwardly spaced relation to the bearing tube 26 and are connected at the lower ends thereof with a combined agitator-scraper blade 34. The blade 34 is of integral one-piece formation and is formed with a longitudinally disposed cross web 35 having downturned, vertically disposed scraper flanges 36 disposed on opposite sides thereof. The lower edges of the scraper flanges 36 are arranged in closely spaced relation to the upper surface of the contact plate 22, as shown in Fig. 4, in order that ice crystals formed on the upper surface of the plate 22 may be substantially immediately removed therefrom and distributed throughout the beverage within the receptacle upon rotation of the blade 34. The horizontally disposed web 35 of the blade 34 is formed with a central bearing opening 37 through which the tube 26 extends in order to support the blade for rotation about the lower part of the tube 26. The lower ends of the rods 33 extend within openings formed in the horizontal web 35 of the blade 34 and are secured thereto by any suitable means, such as press-fitting or molding. Thus, in operation, the blade 34 is caused to rotate about the axis of the drive shaft 12 and the shaft extension 28 in a manner to agitate or stir the beverage in the lower regions thereof and to prevent any undesired build-up of ice particles upon the upper surface of the contact plate 22.

In combination with the lower agitator-scraper blade 34, there is provided a second agitator or stirrer 38 of a so-called "floating" type which is intended to insure thorough agitation or stirring of the beverage in the upper levels thereof. The second agitator 38 is formed with a generally rectangular hub portion 39 and a pair of radially opposed, oppositely pitched blades 40. The hub portion 39 of the second agitator is formed with a central rectangular opening 41 which is sized to fit loosely over the drive rods 33 and associated cross arms 32 to permit vertical removal of the second agitator from the agitator drive mechanism. At the same time, the width of the opening 41 is less than the spacing between the rods 33 in order that the second agitator may be driven in rotation by the rods 33, while being free to slide vertically thereon. As shown particularly in Fig. 2, the blades 40 of the floating agitator are pitched upwardly in the direction of rotation of the agitator assembly so that the second agitator, upon rotation, is moved upwardly upon the rods 33, by the resistance of the beverage itself, to a position substantially at or adjacent to the upper level of beverage within the receptacle. At the same time, the weight of the second agitator 38 is such as to cause the same to be at least partially submerged within the upper level of the beverage to impart a stirring action thereto. Thus, as the level of the beverage within the receptacle section is either increased or decreased, the floating agitator 38 will correspondingly rise or fall with the beverage to insure agitation within the upper portions of the beverage, while the lower agitator-scraper blade 34 operates to insure thorough stirring action within the lower regions of the beverage.

In view of the foregoing, it will be seen that the present invention provides an improved, yet mechanically simple, agitator apparatus for semifrozen beverage dispensers which functions to insure thorough and constant stirring of the beverage throughout various levels thereof, thereby minimizing the possibility of separation or stratification of frozen and unfrozen parts of the beverage and consequent lack of uniformity within individual servings withdrawn from the dispenser.

While a single preferred embodiment of our invention has been shown and described in detail, it will be understood that various modifications as to details of construction and design may be resorted to without departing from the spirit of the invention or the scope of the following claims.

We claim:

1. In a dispenser for semifrozen beverages; a receptacle body having upstanding side walls and a bottom; a heat-transfer plate carried by and forming a part of the bottom of said receptacle, said plate having an upper flat surface arranged for direct contact with a beverage contained in said receptacle body; means for cooling said plate and a beverage contained in said body to at least partially freeze the beverage; rotary agitator drive means extending upwardly from the contact portion of said plate to above the normal level of a beverage contained in said receptacle body; a combined agitator and scraper connected to be driven in rotation by said agitator drive means and disposed immediately above the upper surface of said plate for removing frozen beverage particles formed thereon during operation of said dispenser; and a second agitator driven by said drive means and slidably mounted thereon above said agitator and scraper, said second agitator having a pair of radially opposed and angularly pitched blades thereon operable during rotation of said drive means to maintain said second agitator at or near the upper surface of a beverage contained in said receptacle body for imparting stirring movement to the upper regions of the beverage during agitation of the lower regions thereof by said combined agitator and scraper.

2. In a beverage dispenser; a generally vertically arranged receptacle to receive a beverage to be dispensed; a rotary drive shaft extending longitudinally within said receptacle and including a pair of vertically arranged, spaced, parallel rod members united at their upper ends by a crosspiece; and an agitator formed with a central hub portion and a pair of opposed, angularly pitched blades extending radially outwardly from said hub portion, the hub portion of said agitator being formed with a multiangular opening arranged to telescope over the rods and crosspiece of said drive shaft, whereby to drivingly but slidably engage said agitator with said drive shaft, the blades of said agitator being pitched upwardly from the horizontal in the direction of rotation of said drive shaft to cause said agitator, upon rotation, to rise upwardly on said drive shaft substantially to the upper level of a body of liquid within said receptacle.

References Cited in the file of this patent

UNITED STATES PATENTS

| | | |
|---|---|---|
| 1,607,347 | Hemman | Nov. 16, 1926 |
| 1,756,318 | Voss | Apr. 29, 1930 |
| 2,638,329 | Weygand | May 12, 1953 |
| 2,650,079 | Zeiler | Aug. 25, 1953 |

FOREIGN PATENTS

| | | |
|---|---|---|
| 876,246 | Germany | May 11, 1953 |